United States Patent
Jeon (10) Patent No.: US 11,841,819 B2
(45) Date of Patent: Dec. 12, 2023

(54) PERIPHERAL COMPONENT INTERCONNECT EXPRESS INTERFACE DEVICE AND METHOD OF OPERATING THE SAME

(71) Applicant: SK hynix Inc., Icheon (KR)

(72) Inventor: Yong Tae Jeon, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/467,054

(22) Filed: Sep. 3, 2021

(65) Prior Publication Data

US 2022/0309021 A1    Sep. 29, 2022

(30) Foreign Application Priority Data

Mar. 23, 2021 (KR) .................. 10-2021-0037512

(51) Int. Cl.
   *G06F 13/42*    (2006.01)
   *G06F 13/28*    (2006.01)
   *G06F 13/16*    (2006.01)
   *G06F 9/46*     (2006.01)

(52) U.S. Cl.
   CPC .......... *G06F 13/4282* (2013.01); *G06F 9/466* (2013.01); *G06F 13/1673* (2013.01); *G06F 13/28* (2013.01)

(58) Field of Classification Search
   CPC .. G06F 13/4282; G06F 9/466; G06F 13/1673; G06F 13/28
   See application file for complete search history.

(56) References Cited

U.S. PATENT DOCUMENTS

| | | | | |
|---|---|---|---|---|
| 7,852,757 | B1* | 12/2010 | Puranik | H04L 47/30 |
| | | | | 710/52 |
| 8,199,759 | B2* | 6/2012 | Singhal | G06F 13/385 |
| | | | | 370/394 |
| 9,996,484 | B1 | 6/2018 | Davis et al. | |
| 10,176,126 | B1 | 1/2019 | Banerjee et al. | |

(Continued)

FOREIGN PATENT DOCUMENTS

| | | |
|---|---|---|
| JP | 2007065847 A | 3/2007 |
| JP | 2015-503154 A | 1/2015 |

(Continued)

OTHER PUBLICATIONS

Office Action dated Jun. 27, 2022 for U.S. Appl. No. 17/467,070.

(Continued)

*Primary Examiner* — Henry Tsai
*Assistant Examiner* — Harry Z Wang (57) ABSTRACT

Provided are a Peripheral Component Interconnect Express (PCIe) interface device and a method of operating the same. The PCIe interface device includes a first buffer, a second buffer, and a buffer controller. The first buffer may be configured to store a plurality of first transaction layer packets received from multiple functions. The second buffer may be configured to store a plurality of second transaction layer packets received from the multiple functions. The buffer controller may be configured to, when a first buffer of a switch is full, realign an order in which the plurality of second transaction layer packets are to be output from the second buffer to the switch, based on IDs of the plurality of second transaction layer packets.

20 Claims, 6 Drawing Sheets

(56) References Cited

U.S. PATENT DOCUMENTS

| | | | |
|---|---|---|---|
| 2006/0168384 A1* | 7/2006 | Radhakrishnan | G06F 13/385 709/230 |
| 2006/0242332 A1* | 10/2006 | Johnsen | G06F 13/28 710/22 |
| 2006/0259656 A1 | 11/2006 | Sullivan | |
| 2007/0220193 A1 | 9/2007 | Ikeda et al. | |
| 2008/0301605 A1 | 12/2008 | Ando et al. | |
| 2009/0049256 A1* | 2/2009 | Hughes | G06F 13/1626 711/158 |
| 2009/0103434 A1* | 4/2009 | Madsen | H04L 47/10 370/232 |
| 2010/0250785 A1* | 9/2010 | Shin | G06F 3/067 710/3 |
| 2011/0134915 A1 | 6/2011 | Srinivasan | |
| 2011/0289242 A1 | 11/2011 | Srinivasan et al. | |
| 2012/0005300 A1 | 1/2012 | Muppalla | |
| 2014/0237156 A1 | 8/2014 | Regula et al. | |
| 2014/0281053 A1 | 9/2014 | Suzuki et al. | |
| 2014/0281099 A1 | 9/2014 | Avez et al. | |
| 2016/0162436 A1 | 6/2016 | Raghavan et al. | |
| 2017/0123730 A1* | 5/2017 | Losh | G06F 3/067 |
| 2018/0293101 A1* | 10/2018 | Park | G06F 9/5038 |
| 2019/0058675 A1 | 2/2019 | Schubert et al. | |
| 2019/0113957 A1 | 4/2019 | Chiu et al. | |
| 2019/0146684 A1 | 5/2019 | Benisty et al. | |
| 2019/0179784 A1 | 6/2019 | Tsuji et al. | |
| 2019/0354300 A1 | 11/2019 | Benisty et al. | |
| 2020/0065028 A1* | 2/2020 | Keil | G06F 3/0673 |
| 2020/0293499 A1 | 9/2020 | Kohli et al. | |
| 2020/0304426 A1 | 9/2020 | Zhao et al. | |
| 2021/0224210 A1 | 7/2021 | Ouyang et al. | |
| 2022/0124051 A1* | 4/2022 | Brewer | H04L 49/35 |

FOREIGN PATENT DOCUMENTS

| | | |
|---|---|---|
| JP | 2019505924 A | 2/2019 |
| KR | 10-2004-0029010 A | 4/2004 |
| KR | 10-2016-0075312 A | 6/2012 |
| KR | 10-1414079 B1 | 7/2014 |
| KR | 10-2016-0016557 A | 2/2016 |
| KR | 10-2018-0019567 A | 2/2018 |
| KR | 1020190032716 A | 3/2019 |
| KR | 10-2020-0016810 A | 2/2020 |
| KR | 1020200073592 A | 6/2020 |
| KR | 102238652 B1 | 4/2021 |

OTHER PUBLICATIONS

Office Action dated Nov. 9, 2022 for U.S. Appl. No. 17/467,070.
Office Action dated Jan. 12, 2023 for U.S. Appl. No. 17/467,078.
Office Action dated Mar. 27, 2023 for U.S. Appl. No. 17/467,070.
Notice of Allowance dated Sep. 7, 2023 regarding U.S. Appl. No. 17/467,078.
Office Action dated Oct. 18, 2023 for U.S. Appl. No. 17/467,070.

* cited by examiner

PERIPHERAL COMPONENT INTERCONNECT EXPRESS INTERFACE DEVICE AND METHOD OF OPERATING THE SAME

CROSS-REFERENCE TO RELATED APPLICATION

The present application claims priority under 35 U.S.C. § 119(a) to Korean patent application number 10-2021-0037512 filed on Mar. 23, 2021, in the Korean Intellectual Property Office, the entire disclosure of which is incorporated by reference herein.

BACKGROUND

1. Technical Field

Various embodiments of the present disclosure generally relate to an electronic device, and more particularly to a PCIe interface device and a method of operating the PCIe interface device.

2. Related Art

Peripheral Component Interconnect Express (PCIe) is an interface having a serial structure for data communication. A PCIe-based storage device supports a multi-port structure and a multi-function structure. The PCIe-based storage device may be virtualized or non-virtualized, and may achieve Quality of Service (QoS) of a host input/output (I/O) command through one or more PCIe functions.

A storage device is a device which stores data under the control of a host device such as a computer or a smartphone. The storage device may include a memory device in which data is stored and a memory controller which controls the memory device. Memory devices are classified into a volatile memory device and a nonvolatile memory device.

The volatile memory device is a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to a PCIe interface device having improved buffer control performance and a method of operating the PCIe interface device.

An embodiment of the present disclosure may provide for a Peripheral Component Interconnect Express (PCIe) interface device. The PCIe interface device may include a first buffer, a second buffer, and a buffer controller. The first buffer may be configured to store a plurality of first transaction layer packets received from multiple functions. The second buffer may be configured to store a plurality of second transaction layer packets received from the multiple functions. The buffer controller may be configured to, when a first buffer of a switch is full, realign an order in which the plurality of second transaction layer packets are to be output from the second buffer to the switch, based on respective IDs of the plurality of second transaction layer packets.

An embodiment of the present disclosure may provide for a method of operating a Peripheral Component Interconnect Express (PCIe) interface device, the PCIe interface device including a first buffer configured to store a plurality of first transaction layer packets and a second buffer configured to store a plurality of second transaction layer packets. The method may include receiving, from a switch, a flow control signal indicating whether a first buffer of the switch is full, and when the first buffer included in the switch is full, realigning an order in which the plurality of second transaction layer packets are to be output from the second buffer to the switch, based on IDs of the plurality of second transaction layer packets.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Figure 1:
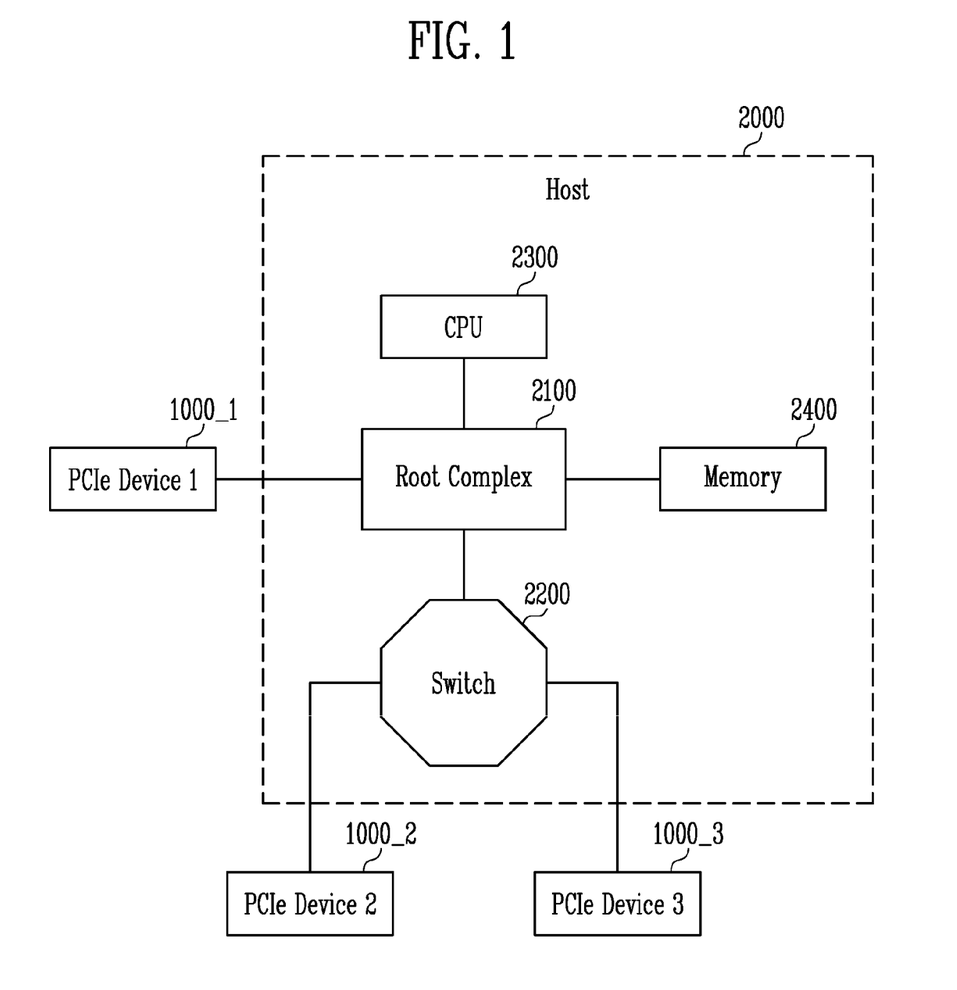
FIG. 1 illustrates a communication structure between a host and PCIe devices according to an embodiment of the present disclosure.

FIG. 1 illustrates a communication structure between a host and a plurality of PCIe devices according to an embodiment of the present disclosure.

Referring to FIG. 1, a host 2000 may include a root complex 2100, a switch 2200, a Central Processing Unit (CPU) 2300, and a memory 2400.

The root complex 2100 may couple the CPU 2300 and the memory 2400 to an input/output (I/O) hierarchy. The root complex 2100 may include at least one host bridge and at least one root port. The root complex 2100 may support one or more Peripheral Component Interconnect Express (PCIe) ports.

The root complex 2100 may support input/output (I/O) requests. The root complex 2100 must support generation of configuration requests. The root complex 2100 must not support lock semantics as a completer. The root complex 2100 may request generation of a locked request as a requester.

The switch 2200 may couple at least two ports to each other so as to route transaction layer packets. The switch 2200 may be a set of virtual PCI-to-PCI bridge devices. The switch 2200 may be composed of two or more logical PCI-to-PCI bridges. The switch 2200 may route a transaction using a PCI bridge mechanism (i.e., an address-based multicasting manner). The switch 2200 must route all types of transaction layer packets between all ports. The switch 2200 must support a locked request. Each enabled port of the switch 2200 must support a flow control. The switch 2200 may arbitrate a contention in a round robin or weighted round robin manner when the contention occurs on the same virtual channel.

Each PCIe device may function as a requester or a completer of a PCIe transaction.

In FIG. 1, a plurality of PCIe device, e.g., first to third PCIe devices 1000_1 to 1000_3, are coupled to the host 2000. The first PCIe device 1000_1 may transmit and receive transaction layer packets to and from the root complex 2100. The second and third PCIe devices 1000_2 and 1000_3 may transmit and receive transaction layer packets to and from the switch 2200.

The switch 2200 may route the transaction layer packets, received from the second and third PCIe devices 1000_2 and 1000_3, to the root complex 2100. The switch 2200 may route transaction layer packets, received from the root complex 2100, to the second and third PCIe devices 1000_2 and 1000_3.

Therefore, the root complex 2100 may transmit and receive transaction layer packets directly to and from the first PCIe device 1000_1. The root complex 2100 may transmit and receive transaction layer packets to and from the second and third PCIe devices 1000_2 and 1000_3 through the switch 2200. The root complex 2100 may forward the transaction layer packets, received from the first to third PCIe devices 1000_1 to 1000_3, to the CPU 2300 or the memory 2400.

Figure 2:
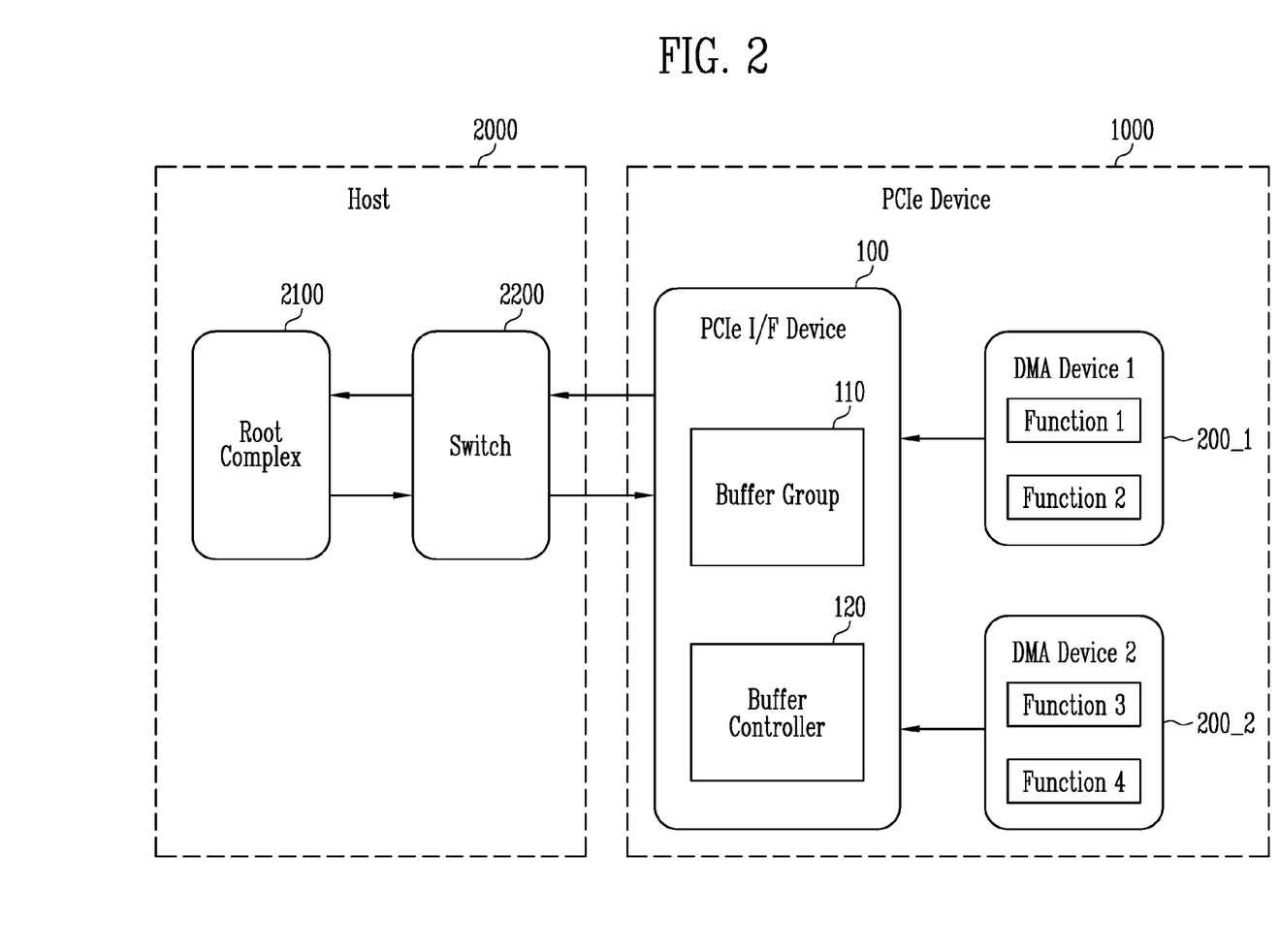
FIG. 2 illustrates the configuration and operation of a PCIe device according to an embodiment of the present disclosure.

FIG. 2 illustrates the configuration and operation of a PCIe device according to an embodiment of the present disclosure.

Referring to FIG. 2, a PCIe device 1000 may include a PCIe interface (I/F) device 100 and at least one Direct Memory Access (DMA) device.

The PCIe interface device 100 may include a buffer group 110 and a buffer controller 120.

The buffer group 110 may store transaction layer packets that are transmitted and received between a switch 2200 of a host 2000 and a function of the DMA device. The buffer group 110 may store a first transaction layer packet received from the function executed on the DMA device. The buffer group 110 may transmit the first transaction layer packet to the switch 2200. Meanwhile, the buffer group 110 may store a second transaction layer packet received from the switch 2200. The buffer group 110 may transmit the second transaction layer packet to the function of the DMA device.

The buffer controller 120 may control an order of outputting a plurality of transaction layer packets, stored in the buffer group 110, to the switch 2200. In addition, the buffer controller 120 may realign the outputting order of the plurality of transaction layer packets.

In an embodiment, the DMA device may include a NonVolatile Memory Express (NVMe) module, an Ethernet card, a sound card, a graphics card, an Artificial Intelligence Central Processing Unit (AI CPU) module, an Artificial Intelligence System on Chip (AI SoC) module, or the like. The DMA device may further include a data communication device coupled to the NVMe module, the Ethernet card, the sound card, the graphics card, the AI CPU module, the AI SoC module, or the like.

In FIG. 2, the PCIe device 1000 may include a plurality of DMA devices, e.g., first and second DMA devices 200_1 and 200_2. The number of DMA devices included in the PCIe device 1000 is not limited to the present embodiment.

For each DMA device, at least one function may be executed. For example, referring to FIG. 2, a first function (Function 1) and a second function (Function 2) may be executed on the first DMA device 200_1, and a third function (Function 3) and a fourth function (Function 4) may be executed on the second DMA device 200_2. The number of functions executed on each DMA device is not limited to the present embodiment.

For example, the PCIe device 1000 may generate a physical function or a virtual function in response to a virtualization request received from the host 2000. The PCIe device 1000 may allocate one or more functions to each DMA device. The number of functions allocated to and executed on each DMA device may be individually set. Therefore, a plurality of functions may be allocated to one DMA device, and each function may be executed as an independent operation unit.

Figure 3:
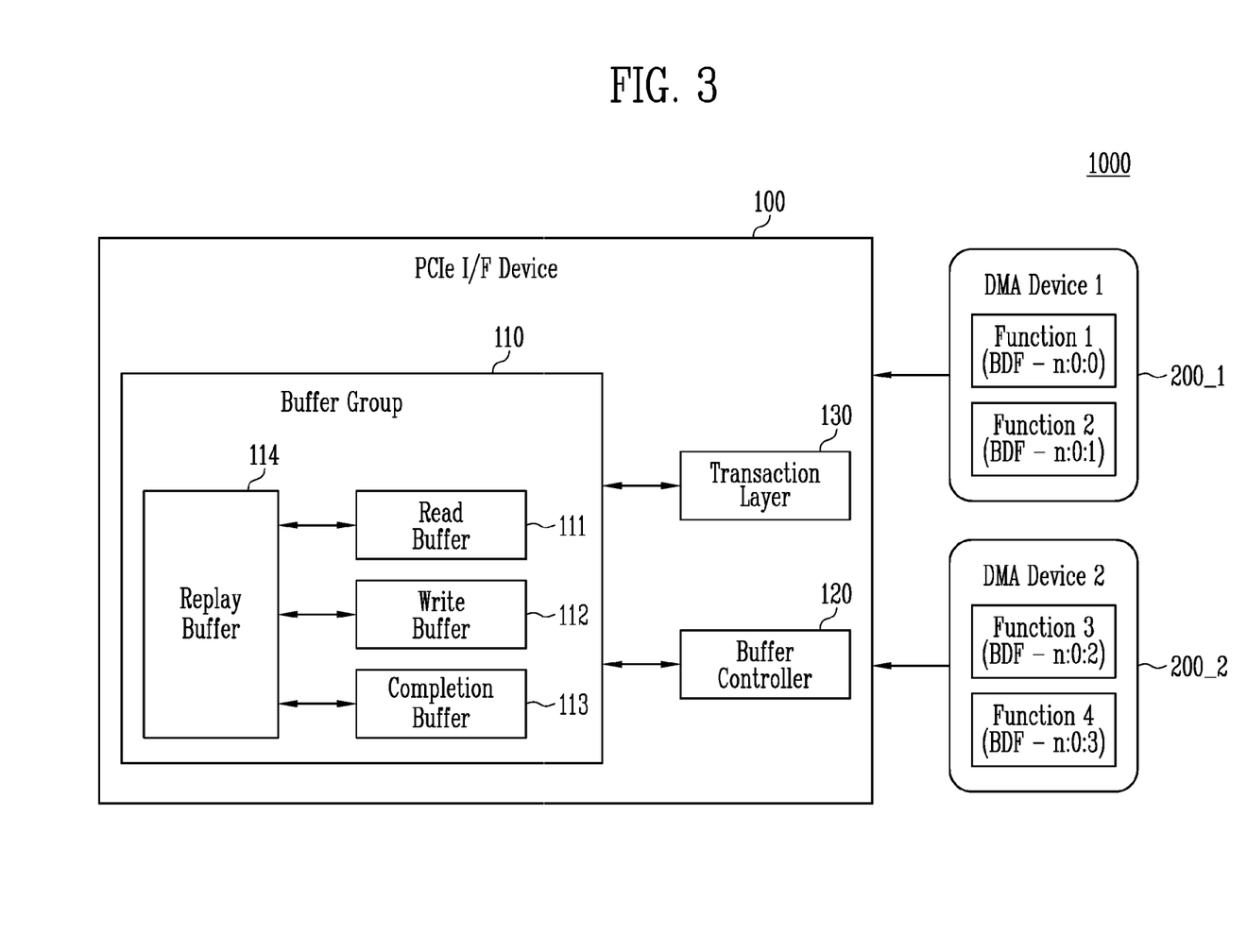
FIG. 3 illustrates the configuration and operation of a PCIe interface device according to an embodiment of the present disclosure.

FIG. 3 illustrates the configuration and operation of a PCIe interface device according to an embodiment of the present disclosure.

Referring to FIG. 3, a PCIe device 1000 may include a PCIe interface device 100 and a plurality of DMA devices 200_1 and 200_2.

The PCIe interface device 100 may include a buffer group 110, a buffer controller 120, and a transaction layer 130.

The buffer group 110 may transmit a transaction layer packet, received from a function of each DMA device through the transaction layer 130, to the switch 2200 of the host 2000 described above with reference to FIG. 2. The buffer group 110 may transmit a transaction layer packet, received from the switch 2200 to a function of a corresponding DMA device through the transaction layer 130.

In FIG. 3, the buffer group 110 may include a read buffer 111, a write buffer 112, a completion buffer 113, and a replay buffer 114. Each of the read buffer 111, the write buffer 112, and the completion buffer 113 may include a transmission buffer which transmits a stored transaction layer packet to the switch 2200, and a reception buffer which stores a transaction layer packet received from the switch 2200. In an embodiment, the buffer group 110 may transmit and receive a transaction layer packet directly to and from a root complex 2100 of the host 2000.

The read buffer 111 may store a transaction layer packet related to a read request. The write buffer 112 may store a transaction layer packet related to a write request. The completion buffer 113 may store a transaction layer packet related to completion of the read request or the write request. Completion may indicate whether the read request or the write request has been received and processing of the read request or the write request has been completed or not.

Transaction layer packets stored in the read buffer 111, the write buffer 112, and the completion buffer 113, respectively, may be transmitted to the replay buffer 114. An order in which transaction layer packets are transmitted from the read buffer 111, the write buffer 112, and the completion buffer 113 to the replay buffer 114 may be changed by the buffer controller 120.

The replay buffer 114 may output the transaction layer packets to the switch 2200 in the order in which the transaction layer packets are transmitted from the read buffer 111, the write buffer 112, and the completion buffer 113 to the replay buffer 114. The order in which the transaction layer packets, stored in the replay buffer 114, are output to the switch 2200 may be fixed without being changed during operation.

The buffer controller 120 may realign the outputting order of the transaction layer packets stored in the read buffer 111 and the write buffer 112 based on identifications (IDs) of the transaction layer packets.

Here, the transaction layer packets may be packets for which ID-Based Ordering (IDO) is allowed. In a header of each transaction layer packet for which the IDO is allowed, an IDO bit may be set to 1. The transaction layer packets for which the IDO is allowed may be independently determined depending on transactions between devices, and then ordering thereof may be changed in the root complex 2100 or the switch 2200. In another embodiment, the ordering of the transaction layer packets for which the IDO is allowed may be changed by the PCIe device 1000.

An ID of each transaction layer packet may include an identification number of a bus, an identification number of a device, and an identification number of a function, which correspond to the transaction layer packet.

For example, the PCIe interface device 100 may receive a transaction layer packet from at least one DMA device through at least one bus. An identification number of the bus corresponding to the transaction layer packet may be a number allocated by the host 2000 described above with reference to FIG. 1. An identification number of a device corresponding to the transaction layer packet may be an identification number of the PCIe device 1000. An identification number of a function corresponding to the transaction layer packet may be a unique number of each function implemented in the PCIe device 1000.

In FIG. 3, the identification number of the bus may be n (where n is a natural number), and the identification number of the PCIe device 1000 may be 0. Respective identification numbers of first to fourth functions may be 0 to 3, respectively. Therefore, an ID of a transaction layer packet received from the first function executed on the first DMA device 200_1 may be (n:0:0). An ID of a transaction layer packet received from the second function executed on the first DMA device 200_1 may be (n:0:1). An ID of a transaction layer packet received from the third function executed on the second DMA device 200_2 may be (n:0:2). An ID of a transaction layer packet received from the fourth function executed on the second DMA device 200_2 may be (n:0:3).

Figure 4:
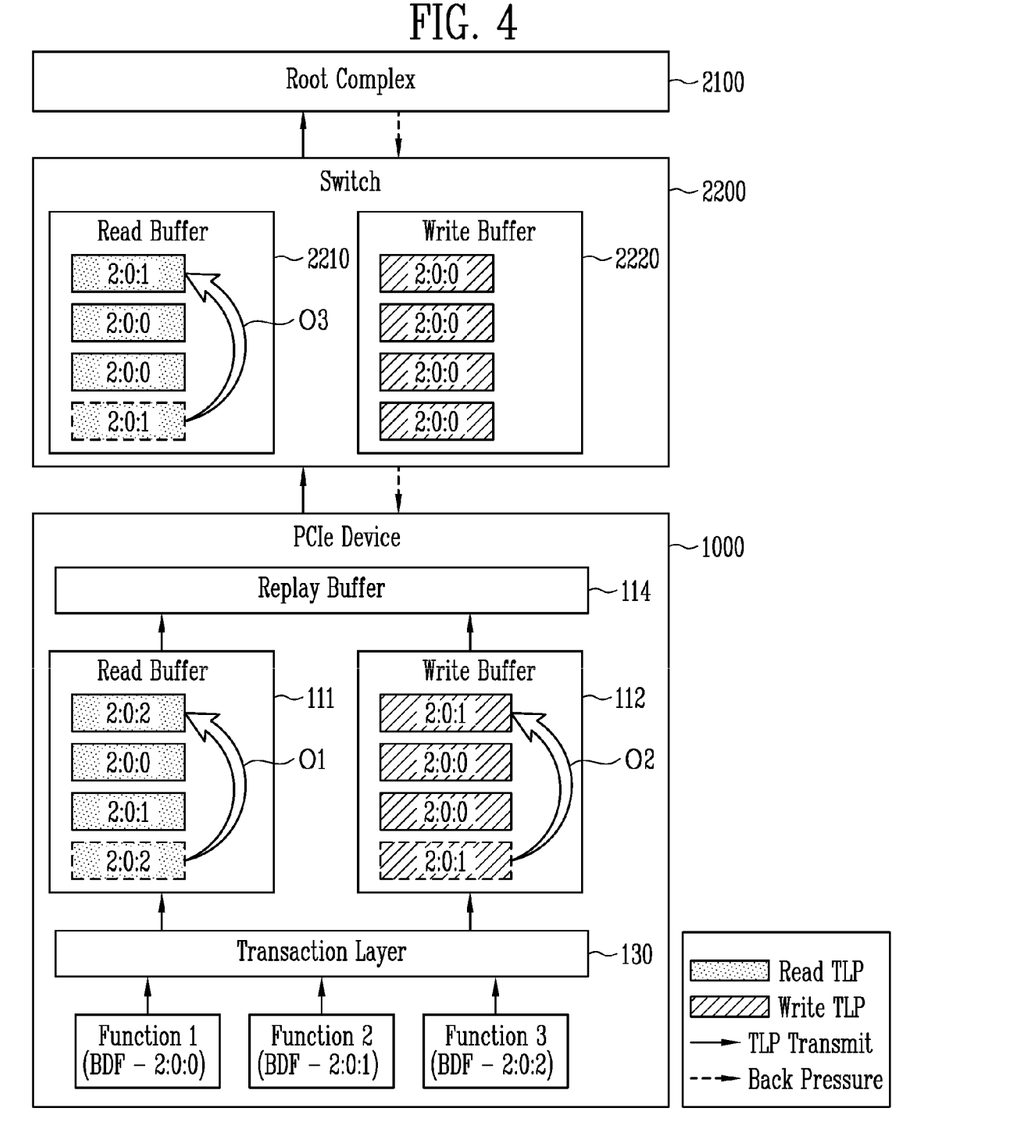
FIG. 4 describes ordering realignment for transaction layer packets based on IDs of the transaction layer packets in a PCIe device.

FIG. 4 describes ordering realignment for transaction layer packets based on IDs of the transaction layer packets in a PCIe device.

Referring to FIG. 4, a read buffer 2210 and a write buffer 2220 of a switch 2200 can each store four transaction layer packets. However, the number of transaction layer packets that can be stored in each buffer is not limited to the present embodiment.

In FIG. 4, the write buffer 2220 of the switch 2200 stores four first transaction layer packets, and thus it is full of the transaction layer packets. The read buffer 2210 of the switch 2200 stores three second transaction layer packets, and thus it is capable of additionally store one new transaction layer packet.

A PCIe device 1000 may include a first buffer and a second buffer.

The first buffer may receive a plurality of first transaction layer packets from multiple functions (e.g., Function 1 to Function 3) of DMA devices through a transaction layer 130.

The second buffer may receive a plurality of second transaction layer packets from the multiple functions (Function 1 to Function 3) of the DMA devices through the transaction layer 130.

In FIG. 4, the first buffer may be a write buffer 112, and the second buffer may be a read buffer 111. The first transaction layer packets may be transaction layer packets related to a write request, and the second transaction layer packets may be transaction layer packets related to a read request.

In another embodiment, the first buffer may be the read buffer 111, and the second buffer may be the write buffer 112. The first transaction layer packets may be transaction layer packets related to a read request, and the second transaction layer packets may be transaction layer packets related to a write request.

In FIG. 4, an identification number of a bus may be 2, and an identification number of the PCIe device 1000 may be 0. Respective identification numbers of the first to third functions (Function 1 to Function 3) may be 0 to 2. Therefore, an ID of the transaction layer packet received from the first function (Function 1) may be (2:0:0). An ID of the transaction layer packet received from the second function (Function 2) may be (2:0:1). An ID of the transaction layer packet received from the third function (Function 3) may be (2:0:2).

A root complex 2100 and the switch 2200 may exchange a flow control signal with each other. The switch 2200 and the PCIe device 1000 may exchange a flow control signal with each other.

The flow control signal may include Update FC (Flow Control). When a transaction layer packet is routed from a first side to a third side through a second side, Update FC may be a PCIe protocol by which the second side informs the first side of a state in which the second side is capable of receiving a new transaction layer packet (TLP). In other words, when the second side is ready to transmit a transaction layer packet received from the first side to the third side, the second side may transmit the Update FC to the first side.

The PCIe device 1000 may determine, based on the flow control signal, whether the switch 2200 is in a state in which a first buffer of the switch 2200 is full and thus incapable of receiving a new transaction layer packet, that is, the first buffer of the switch 2200 is under back pressure. In FIG. 4, the first buffer of the switch 2200 may be the write buffer 2220, and a second buffer thereof may be the read buffer 2210. In another embodiment, the first buffer of the switch 2200 may be the read buffer 2210, and the second buffer thereof may be the write buffer 2220.

The PCIe device 1000 may allocate respective priorities to the plurality of second transaction layer packets in an order in which the second transaction layer packets are input from the multiple functions (Function 1 to Function 3) to the read buffer 111.

When the write buffer 2220 of the switch 2200 is full, the PCIe device 1000 may realign an order in which the plurality of second transaction layer packets are to be output from the read buffer 111 of the PCIe device 1000 to the switch 2200, based on the respective IDs of the second transaction layer packets.

In a first ordering realignment (O1) process, the PCIe device 1000 may set priorities of second target transaction layer packets, among the plurality of second transaction layer packets stored in the read buffer 111, to be higher than those of the remaining second transaction layer packets.

In an embodiment, the second target transaction layer packets may be transaction layer packets having IDs different from those of transaction layer packets pending in the write buffer 2220 of the switch 2200.

For example, the IDs of the transaction layer packets pending in the write buffer 2220 of the switch 2200 may be (2:0:0). Among the IDs of the second transaction layer packets stored in the read buffer 111, IDs different from (2:0:0) may be (2:0:1) and (2:0:2).

Therefore, among the plurality of second transaction layer packets, the second transaction layer packets having (2:0:1) and (2:0:2) as IDs may be set to be the second target transaction layer packets having priorities higher than those of the second transaction layer packets having (2:0:0) as IDs. The second transaction layer packets having higher priorities may be output to the read buffer 2210, which is the second buffer of the switch 2200, prior to the second transaction layer packets having a lower priority.

In another embodiment, the second target transaction layer packets may be transaction layer packets having IDs different from those of the plurality of first transaction layer packets stored in the write buffer 112 of the PCIe device 1000.

For example, the IDs of the plurality of first transaction layer packets stored in the write buffer 112 of the PCIe device 1000 may be (2:0:0) and (2:0:1). Among the IDs of the second transaction layer packets stored in the read buffer 111, IDs different from (2:0:0) and (2:0:1) may be (2:0:2).

Therefore, among the plurality of second transaction layer packets, the second transaction layer packets having (2:0:2) as IDs may be set to be the second target transaction layer packets having a priority higher than those of the second transaction layer packets having (2:0:0) and (2:0:1) as IDs.

Consequently, among the plurality of second transaction layer packets stored in the read buffer 111 of the PCIe device 1000, the priorities of the second transaction layer packets having (2:0:2) as an ID that is different from (2:0:0), which is the ID of the transaction layer packets pending in the write buffer 2220 of the switch 2200, and different from (2:0:0) and (2:0:1), which are the IDs of the plurality of first transaction layer packets stored in the write buffer 112 of the PCIe device 1000, may be set to be higher than those of the remaining second transaction layer packets having (2:0:0) and (2:0:1) as IDs.

The priorities of the second target transaction layer packets having IDs different from those of the transaction layer packets pending in the write buffer 2220 of the switch 2200 may be realigned such that the second target transaction layer packets are output from the read buffer 111 of the PCIe device 1000 to the read buffer 2210 of the switch 2200, prior to the remaining second transaction layer packets.

The reason for this is that the write buffer 2220 of the switch 2200 is under back pressure, but the read buffer 2210 is capable of receiving a new transaction layer packet, and thus the second target transaction layer packets having IDs different from those of the transaction layer packets pending in the write buffer 2220 are output to the read buffer 2210 of the switch 2200 to thereby achieve QoS for each function. In other words, the reason for this is to preferentially process transaction layer packets having IDs different from those of transaction layer packets under back pressure by independently realigning the outputting order depending on the IDs of the transaction layer packets.

However, even if the outputting order is realigned depending on the IDs of the transaction layer packets, an outputting order between a first transaction layer packet and a second transaction layer packet having the same ID must be kept.

The PCIe device 1000 may realign an order in which the plurality of first transaction layer packets are to be output from the write buffer 112 based on respective IDs of the plurality of first transaction layer packets.

In a second ordering realignment (O2) process, the PCIe device 1000 may set priorities of first target transaction layer packets, among the plurality of first transaction layer packets stored in the first buffer, e.g., the write buffer 112, to be higher than those of the remaining first transaction layer packets.

The first target transaction layer packets may be transaction layer packets having IDs different from those of transaction layer packets pending in the write buffer 2220 of the switch 2200.

For example, the IDs of the transaction layer packets pending in the write buffer 2220 of the switch 2200 may be (2:0:0). Among the IDs of the first transaction layer packets stored in the write buffer 112, an ID different from (2:0:0) may be (2:0:1).

Priorities may be realigned such that the first transaction layer packets having an ID (2:0:1) different from an ID (2:0:0) of the transaction layer packets pending in the write buffer 2220 of the switch 2200 are output from the write buffer 112 of the PCIe device 1000 to the write buffer 2220 of the switch 2200, prior to the remaining first transaction layer packets.

The reason for this is to realign priorities so that first transaction layer packets having IDs different from those of the transaction layer packets pending in the write buffer 2220 of the switch 2200 are first output to the write buffer 2220, thus preventing transaction layer packets having the ID (2:0:0) from being successively processed.

That is, transaction layer packets having IDs different from those of transaction layer packets under back pressure are first processed, thus preventing an occupation rate of transaction layer packets having a specific ID from excessively increasing, and achieving QoS for each function.

Similarly to the first ordering realignment (O1) process, the switch 2200 may realign priorities of the transaction layer packets stored in the read buffer 2210 in a third ordering realignment (O3) process.

In accordance with an embodiment of the present disclosure, the PCIe device 1000 may independently change the outputting order of transaction layer packets depending on IDs of the transaction layer packets. That is, not only the root complex 2100 and the switch 2200 but also the PCIe device 1000 may change the outputting order of the transaction layer packets for which the IDO is allowed, thus more efficiently achieving QoS for each function.

Figure 5:
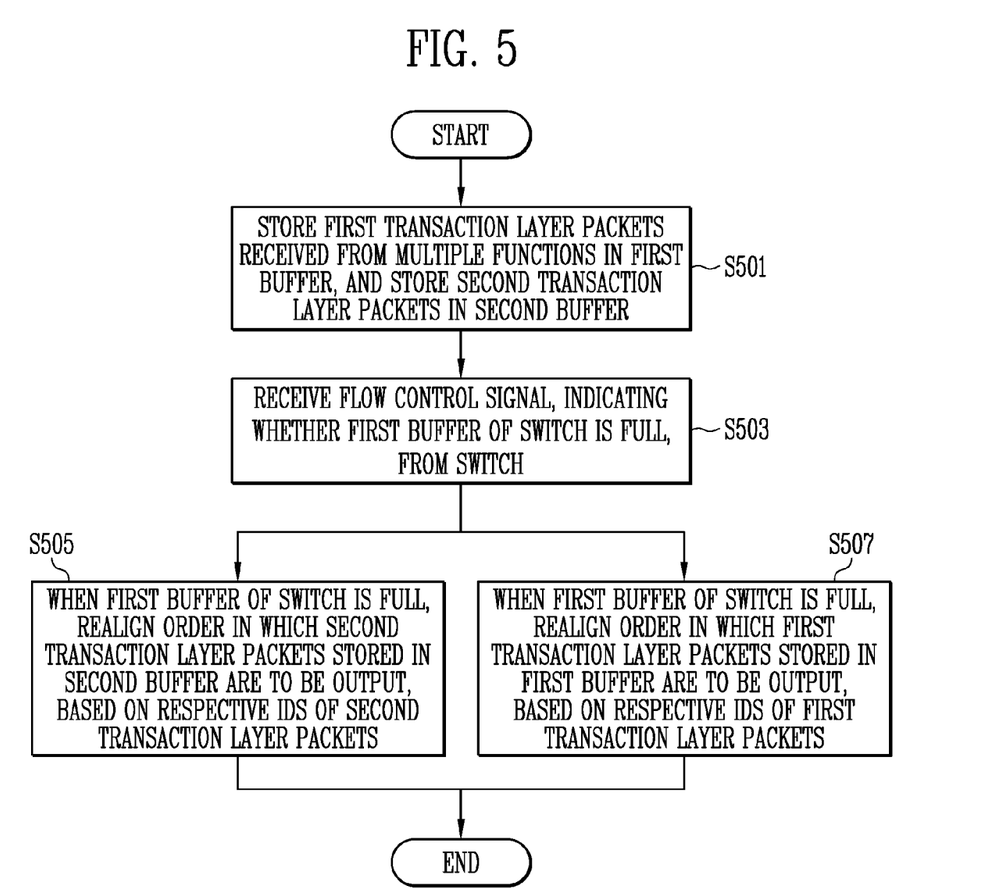
FIG. 5 is a flowchart illustrating an operation of a PCIe interface device according to an embodiment of the present disclosure.

FIG. 5 is a flowchart illustrating an operation of a PCIe interface device according to an embodiment of the present disclosure.

Referring to FIG. 5, at S501, the PCIe interface device may store first transaction layer packets received from multiple functions of DMA devices in a first buffer, and may store second transaction layer packets received from the multiple functions of the DMA devices in a second buffer.

In an embodiment, the first buffer may be a write buffer, the second buffer may be a read buffer, the first transaction layer packets may be packets related to a write request, and the second transaction layer packets may be packets related to a read request.

In another embodiment, the first buffer may be the read buffer, the second buffer may be the write buffer, the first transaction layer packets may be packets related to the read request, and the second transaction layer packets may be packets related to the write request.

At S503, the PCIe interface device may receive a flow control signal, indicating whether a first buffer of a switch is full, from the switch. The first buffer of the switch may be a write buffer. In an embodiment, the PCIe interface device may receive a flow control signal, indicating whether the first buffer of the switch is capable of receiving a new transaction layer packet, from the switch. The PCIe interface device may determine, based on the flow control signal, whether the first buffer of the switch is full or capable of receiving a new transaction layer packet.

At S505, when the first buffer of the switch is full, the PCIe interface device may realign an order in which the second transaction layer packets stored in the second buffer of the PCIe interface device are to be output to the switch, based on respective IDs of the second transaction layer packets.

At S507, when the first buffer of the switch is full, the PCIe interface device may realign an order in which the first transaction layer packets stored in the first buffer of the PCIe interface device are to be output to the switch, based on respective IDs of the first transaction layer packets.

Figure 6:
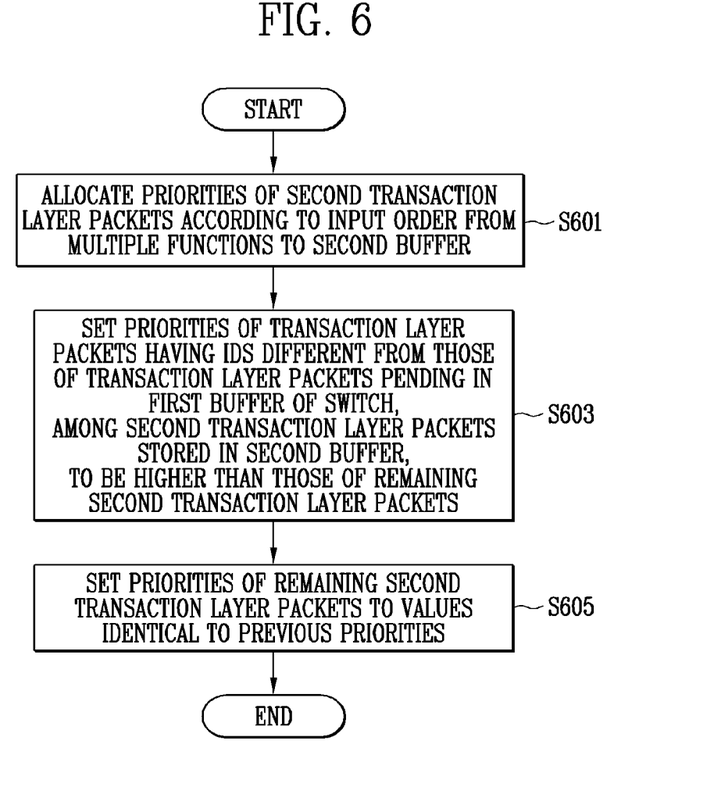
FIG. 6 is a flowchart illustrating an operation of a PCIe interface device according to an embodiment of the present disclosure.

FIG. 6 is a flowchart illustrating an operation of a PCIe interface device according to an embodiment of the present disclosure.

Referring to FIG. 6, at S601, the PCIe interface device may allocate priorities of second transaction layer packets according to an order in which the second transaction layer packets are input from multiple functions to a second buffer of the PCIe interface device.

At S603, the PCIe interface device may set priorities of second transaction layer packets having IDs different from those of transaction layer packets pending in a first buffer of a switch, among the second transaction layer packets stored in the second buffer, to be higher than those of the remaining second transaction layer packets.

At S605, the PCIe interface device may set the priorities of the remaining second transaction layer packets to values identical to previous priorities thereof.

In accordance with the present disclosure, there are provided a PCIe interface device having improved buffer control performance and a method of operating the PCIe interface device.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

What is claimed is:

1. A Peripheral Component Interconnect Express (PCIe) device, comprising:
   at least one Direct Memory Access (DMA) device configured to execute a first function and a second function;
   a first buffer configured to store a plurality of first transaction layer packets received from the first function and the second function;
   a second buffer configured to store a plurality of second transaction layer packets including first source transaction layer packets from the first function and second source transaction layer packets from the second function; and
   a buffer controller configured to, when a first buffer of a switch is full, change features of the plurality of second transaction layer packets to realign an order in which the plurality of second transaction layer packets are to be output from the second buffer to a second buffer of the switch, based on IDs of the plurality of second transaction layer packets.

2. The PCIe device according to claim 1, wherein:
   each of the first buffer of the PCIe device and the first buffer of the switch is a write buffer, and
   each of the second buffer of the PCIe device and the second buffer of the switch is a read buffer.

3. The PCIe device according to claim 1, wherein the buffer controller is configured to allocate respective priorities of the plurality of second transaction layer packets according to an order in which the plurality of second transaction layer packets are input to the second buffer of the PCIe device.

4. The PCIe device according to claim 3, wherein the buffer controller is configured to:
   set priorities of second target transaction layer packets, among the plurality of second transaction layer packets, to be higher than priorities of remaining second transaction layer packets other than the second target transaction layer packets,
   wherein the second target transaction layer packets are second transaction layer packets having IDs different from IDs of first transaction layer packets pending in the first buffer of the switch.

5. The PCIe device according to claim 4, wherein the buffer controller is configured to maintain the priorities of the remaining second transaction layer packets at values identical to previous priorities thereof.

6. The PCIe device according to claim 4, wherein the second target transaction layer packets are second transaction layer packets having IDs different from IDs of the plurality of first transaction layer packets.

7. The PCIe device according to claim 1, wherein the buffer controller is further configured to realign an order in which the plurality of first transaction layer packets are to be output from the first buffer of the PCIe device to the switch, based on IDs of the plurality of first transaction layer packets.

8. The PCIe device according to claim 7, wherein the buffer controller is configured to:
   set priorities of first target transaction layer packets, among the plurality of first transaction layer packets, to be higher than priorities of remaining first transaction layer packets other than the first target transaction layer packets,
   wherein the first target transaction layer packets are first transaction layer packets having IDs different from IDs of first transaction layer packets pending in the first buffer of the switch.

9. The PCIe device according to claim 1, wherein the first buffer and the second buffer of the PCIe device are configured to receive the plurality of first transaction layer packets and the plurality of second transaction layer packets from multiple functions including the first function and the second function, executed on the DMA device, through at least one bus.

10. The PCIe device according to claim 9, wherein an ID of each transaction layer packet includes an identification number of a bus corresponding to the transaction layer packet, an identification number of the PCIe device corresponding to the transaction layer packet, and an identification number of a function corresponding to the transaction layer packet.

11. The PCIe device according to claim 9, wherein the at least one DMA device comprises at least one of a NonVolatile Memory Express (NVMe) module, an Artificial Intelligence Central Processing Unit (AI CPU) module, an Artificial Intelligence System on Chip (AI SoC) module, an Ethernet card, a sound card, and a graphics card.

12. A method of operating a Peripheral Component Interconnect Express (PCIe) device, the PCIe device including a first buffer configured to store a plurality of first transaction layer packets and a second buffer configured to store a plurality of second transaction layer packets, the method comprising:
   receiving first source transaction layer packets from a first function and second source transaction layer packets from a second function;
   receiving, from a switch, a flow control signal indicating whether a first buffer of the switch is full; and
   when the first buffer of the switch is full, changing features of the plurality of second transaction layer packets including the first source transaction layer packets and the second source transaction layer packets to realign an order in which the plurality of second transaction layer packets are to be output from the second buffer to a second buffer of the switch, based on IDs of the plurality of second transaction layer packets.

13. The method according to claim 12, wherein:
   each of the first buffer of the PCIe device and the first buffer of the switch is a write buffer, and
   each of the second buffer of the PCIe device and the second buffer of the switch is a read buffer.

14. The method according to claim 12, further comprising:
   allocating respective priorities of the plurality of second transaction layer packets according to an order in which the plurality of second transaction layer packets are input from multiple functions including the first function and the second function to the second buffer of the PCIe device.

15. The method according to claim 14, wherein changing features of the plurality of second transaction layer packets comprises:
   setting priorities of second target transaction layer packets, among the plurality of second transaction layer packets, to be higher than priorities of remaining second transaction layer packets other than the second target transaction layer packets,
   wherein the second target transaction layer packets are second transaction layer packets having IDs different from IDs of first transaction layer packets pending in the first buffer of the switch.

16. The method according to claim 15, wherein the second target transaction layer packets are second transaction layer packets having IDs different from IDs of the plurality of first transaction layer packets.

17. The method according to claim 12, further comprising:
   realigning an order in which the plurality of first transaction layer packets are to be output from the first buffer of the PCIe device to the switch, based on IDs of the plurality of first transaction layer packets.

18. The method according to claim 17, wherein realigning the order in which the plurality of first transaction layer packets are to be output comprises:
   setting priorities of first target transaction layer packets, among the plurality of first transaction layer packets, to be higher than priorities of remaining first transaction layer packets other than the first target transaction layer packets,
   wherein the first target transaction layer packets are first transaction layer packets having IDs different from IDs of first transaction layer packets pending in the first buffer of the switch.

19. The method according to claim 14, further comprising:
   receiving the plurality of first transaction layer packets and the plurality of second transaction layer packets from multiple functions including the first function and the second function, executed on at least one Direct Memory Access (DMA) device, through at least one bus.

20. The method according to claim 19, wherein an ID of each transaction layer packet includes an identification number of a bus corresponding to the transaction layer packet, an identification number of a PCIe device corresponding to the transaction layer packet, and an identification number of a function corresponding to the transaction layer packet.

* * * * *